(12) United States Patent
Tsai et al.

(10) Patent No.: US 12,314,492 B1
(45) Date of Patent: May 27, 2025

(54) TOUCH SENSOR

(71) Applicant: HIGGSTEC INC., Yilan County (TW)

(72) Inventors: Hung-Yu Tsai, Yilan County (TW);
Yung-Chuan Hsu, Yilan County (TW);
Zhe-Wei Zhang, Yilan County (TW)

(73) Assignee: HIGGSTEC INC., Su'ao Township (TW)

( * ) Notice: Subject to any disclaimer, the term of this patent is extended or adjusted under 35 U.S.C. 154(b) by 0 days.

(21) Appl. No.: 18/613,489

(22) Filed: Mar. 22, 2024

(51) Int. Cl.
*G06F 3/0354* (2013.01)
*G06F 3/044* (2006.01)

(52) U.S. Cl.
CPC ........ *G06F 3/03547* (2013.01); *G06F 3/0443* (2019.05)

(58) Field of Classification Search
CPC ............................. G06F 3/03547; G06F 3/0443
See application file for complete search history.

(56) References Cited

U.S. PATENT DOCUMENTS

2017/0300160 A1* 10/2017 Tsai ................. G06F 3/0412
2018/0196548 A1*  7/2018 Kim ................. G06F 3/0443
2021/0089169 A1*  3/2021 Spevak ............. G06F 3/0448

FOREIGN PATENT DOCUMENTS

| TW | 201205404 | 2/2012 |
| TW | I605369 | 11/2017 |
| TW | I654549 | 3/2019 |
| TW | I709068 | 11/2020 |

\* cited by examiner

*Primary Examiner* — Premal R Patel
(74) *Attorney, Agent, or Firm* — MUNCY, GEISSLER, OLDS & LOWE, P.C.

(57) ABSTRACT

A touch sensor comprises two baseplates, a first electrode, a second electrode and a variable geometry electrode, the baseplates are arranged at intervals, and a first distance formed therebetween, the first electrode is arranged on one of the two baseplates and has a first projected area, the second electrode is arranged on one of the two baseplates same as the first electrode arranged, and a second distance formed between the second electrode and the first electrode, a variable geometry electrode is arranged on the other one of the two baseplates different from the first electrode, and relative positions between the variable geometry electrode and the first electrode selected from one of following: the variable geometry electrode is partially located within the first projected area of the first electrode, the variable geometry electrode is not located within the first projected area of the first electrode.

6 Claims, 3 Drawing Sheets

TOUCH SENSOR

FIELD OF THE INVENTION

The invention relates to a touch sensor, and more particularly to a touch sensor in which a horizontal electric field can be varied.

BACKGROUND OF THE INVENTION

There are many disclosed capacitive touch sensors in existing patents, such as TW 1605369, TW 1654549, TW 201205404A1, and TW 1709068, etc. However, existing touch sensors are generally implemented in a stacked structure, when the touch sensors are touched, an electric field formed by a plurality of electrodes are varied in a vertical direction since the plurality of electrodes are arranged vertically.

Furthermore, conventional touch sensors are limited by stacking structures, making heights of the touch sensors difficult to reduce to match the current design trend of miniaturizing thereof.

SUMMARY OF THE INVENTION

A main object of the invention is to solve the problem of a vertical electric field variation used in conventional touch sensors.

In order to achieve the above object, the invention provides a touch sensor comprising two baseplates, a first electrode, a second electrode, and a variable geometry electrode. The two baseplates are arranged at intervals, and a first distance is formed therebetween. The first electrode is arranged on one of the two baseplates and has a first projected area. The second electrode is arranged on one of the two baseplates same as the first electrode arranged thereon, and a second distance is formed between the second electrode and the first electrode. The variable geometry electrode is arranged on the other one of the two baseplates different from the first electrode, and a relative positions between the variable geometry electrode and the first electrode is selected from one of following: the variable geometry electrode partially located within the first projected area of the first electrode; and the variable geometry electrode not located within the first projected area of the first electrode. The first distance and the second distance are changed when one of the two baseplates is controlled by touching, and an electric field generated between the first electrode and the second electrode varies in a horizontal direction to change a self-capacity signal outputted by the first electrode and the second electrode.

In one embodiment, the second electrode has a second projected area, and the variable geometry electrode is at least partially located within the second projected area.

In one embodiment, the variable geometry electrode is located within the second projected area, and the second electrode on one of the two baseplates is in contact with the variable geometry electrode both before and after being controlled by touching.

In one embodiment, an overall thickness of the second electrode and the variable geometry electrode is greater than the first distance.

In one embodiment, the first electrode is made of a conductive material disposed on one of the two baseplates, and an insulating material disposed on the conductive material.

In one embodiment, the touch sensor comprises at least one support member arranged between the two baseplates, and two ends of the at least one support member are bonded to the two baseplates respectively.

According to the foregoing disclosed summary of the invention, compared with the prior art, the invention has the following characteristics: the touch sensor of the invention changes the positions of the first electrode, the second electrode, and the variable geometry electrode, and uses the horizontal electric field change between the first electrode and the second electrode as the signal change source. Compared with conventional touch sensors, the present invention solves the problem that conventional touch sensors are implemented in a stacked structure and use electric field changes in the vertical direction as the signal source, which makes it difficult to miniaturize the conventional touch sensors.

DETAILED DESCRIPTION OF THE PREFERRED EMBODIMENTS

The detailed description and technical content of the invention are described below with reference to the accompanying drawings.

Figure 1:
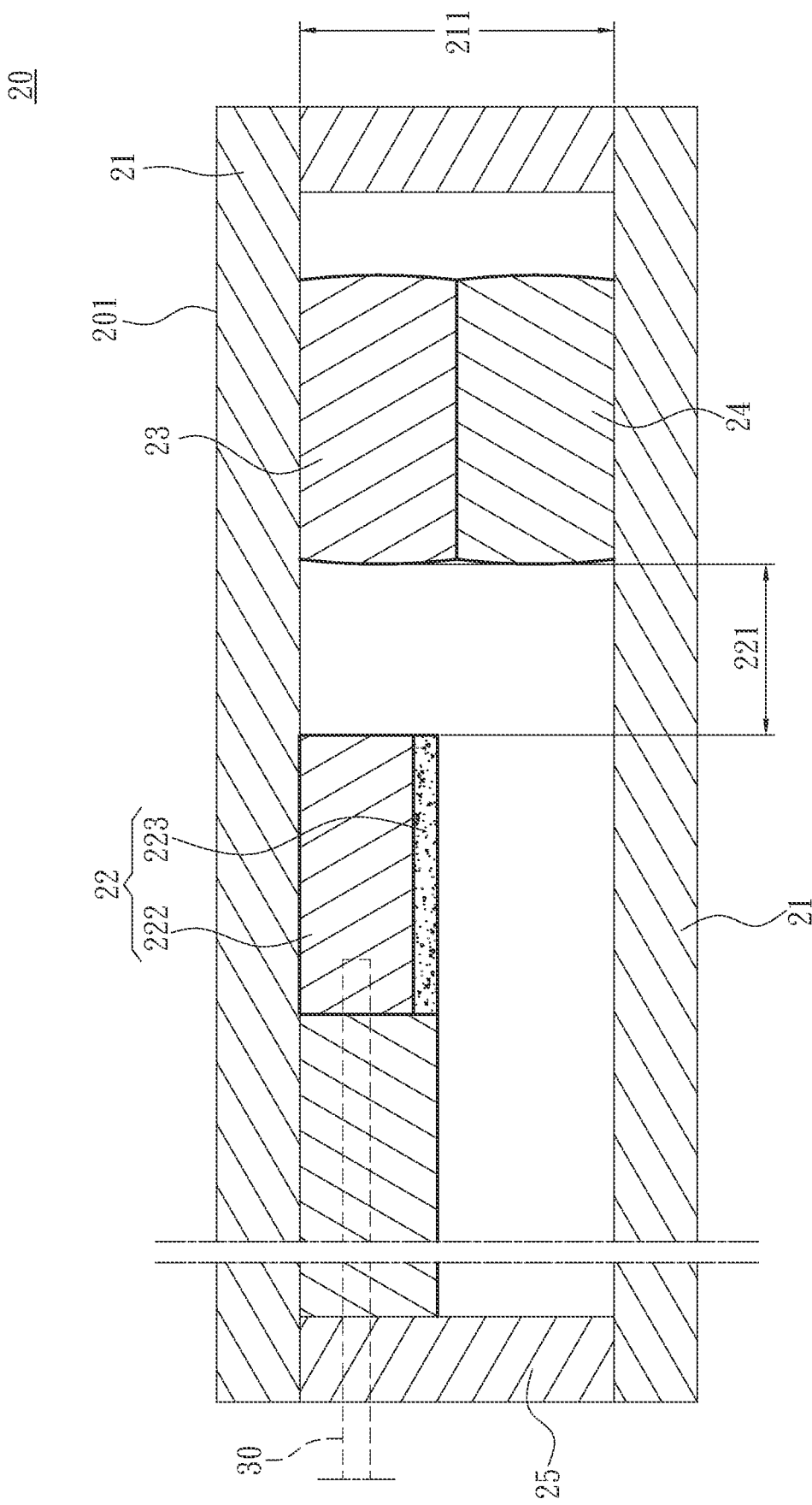
FIG. 1 is a schematic structural diagram of an embodiment of the invention.
Figure 2:
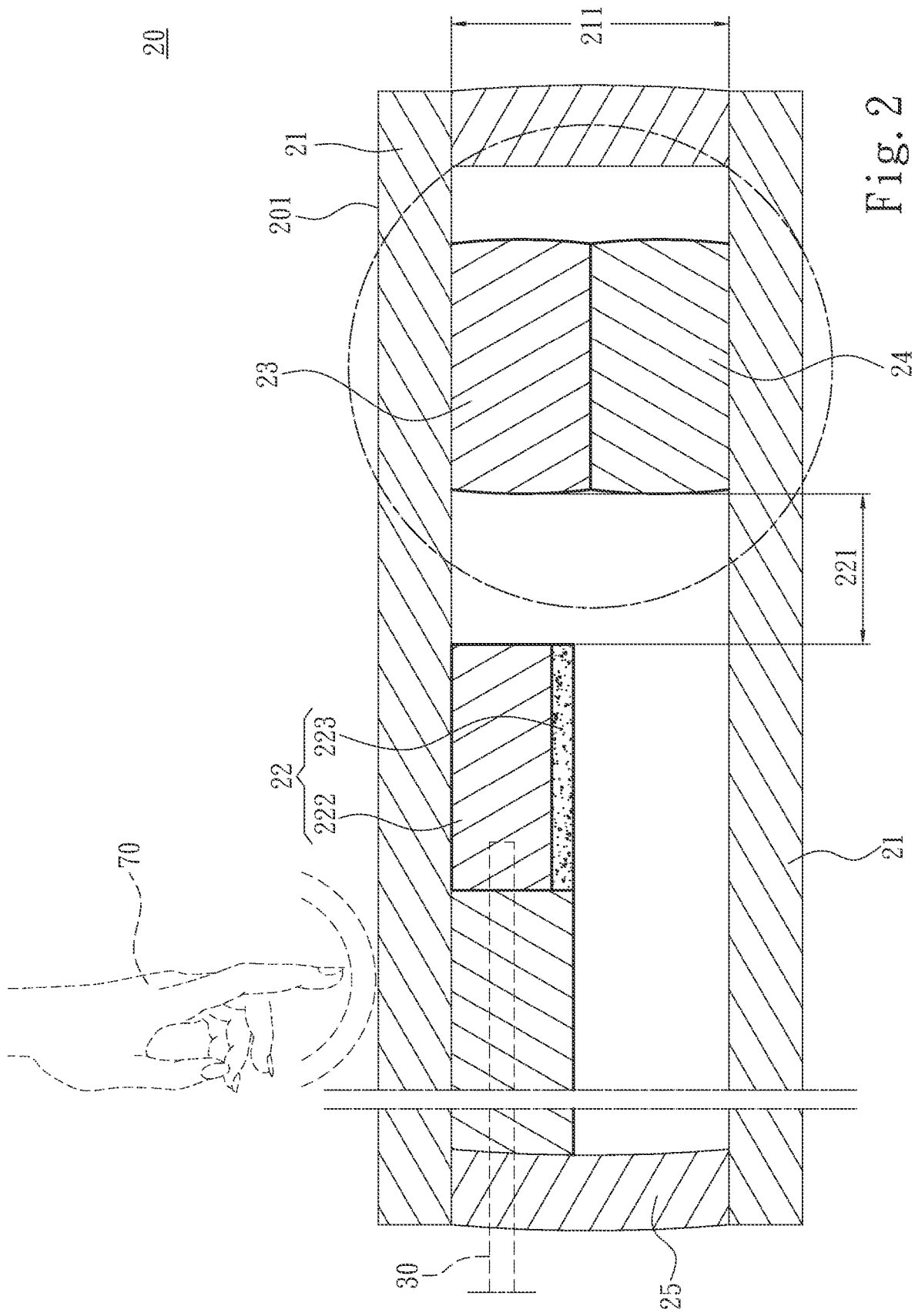
FIG. 2 is a schematic diagram of an embodiment of the invention.
Figure 3:
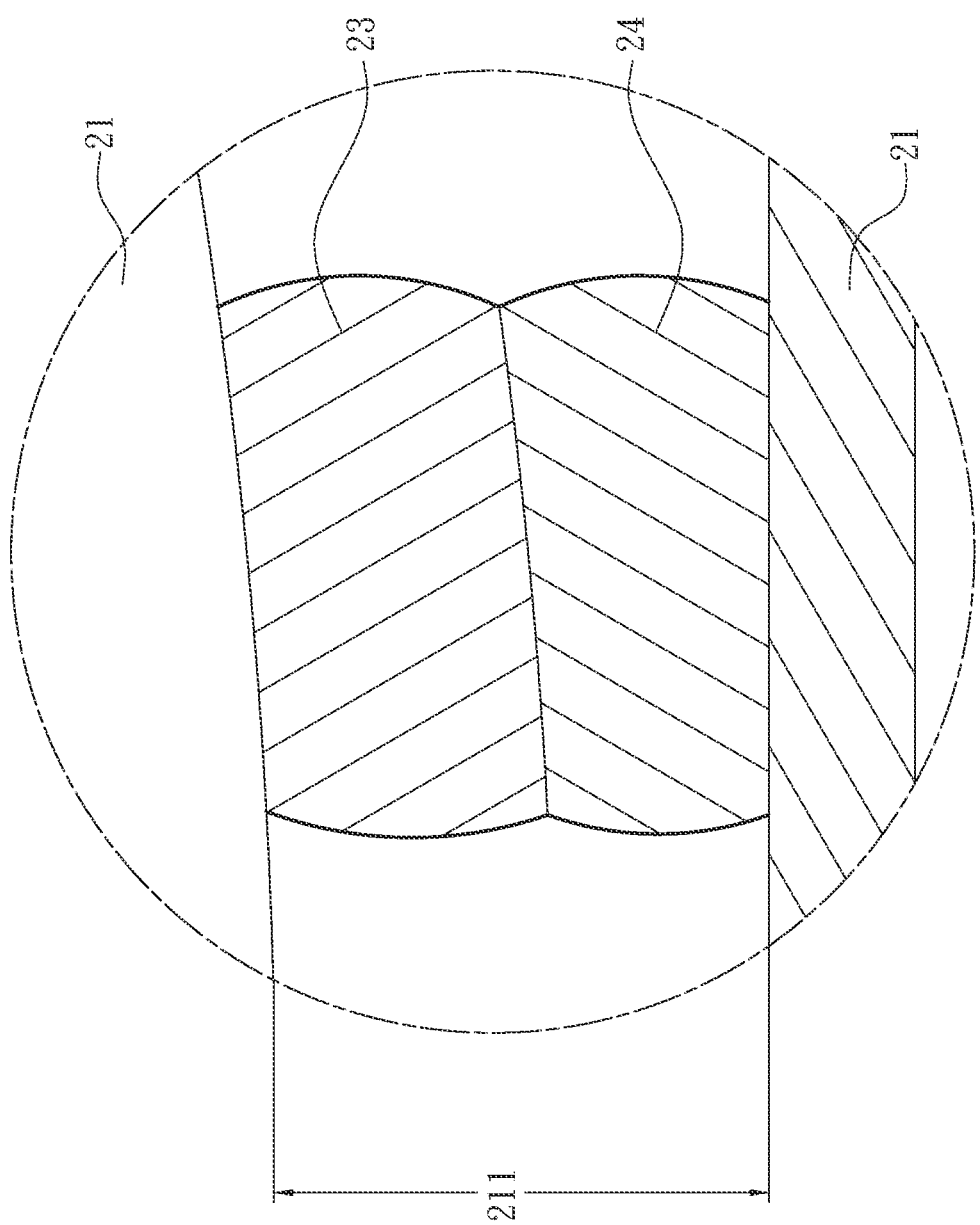
FIG. 3 is an enlarged view of a partial structure of FIG. 2.

Please refer to FIG. 1, FIG. 2, and FIG. 3, the invention provides a touch sensor 20 adapted to a frame position of a touch screen, and the touch screen is provided with a structure additionally used to implement touching. The touch sensor 20 comprises two baseplates 21, a first electrode 22, a second electrode 23, and a variable geometry electrode 24. The two baseplates 21 are arranged at intervals and a first distance 211 is formed therebetween, the two baseplates 21 are provided for protection of the first electrode 22, the second electrode 23, and the variable geometry electrode 24 disposed therein. In detail, the touch sensor 20 includes a touch surface 201, and the touch surface 201 is provided on one of the two baseplates 21 and provided for a user 70 to control by touching.

The first electrode 22 and the second electrode 23 are arranged on a side of one of the two baseplates 21, the first electrode 22 and the second electrode 23 are spaced apart, and a second distance 221 is formed between the first electrode 22 and the second electrode 23. In addition, the first electrode 22 and the second electrode 23 have a first projected area and a second projected area, respectively on the other one of one of the two baseplates 21 when the touch sensor 20 is projected toward a projection direction of one of the two baseplates 21, and the first projected area and the second projected area do not overlap. Furthermore, the first electrode 22 and the second electrode 23 of the present invention are respectively a high electrode potential and a low electrode potential. It should be understood that electrode potentials of the first electrode 22 and the second electrode 23 are comparative values. That is to say, assuming one of the first electrode 22 and the second electrode 23 is grounded, the other one of the first electrode 22 and the second electrode 23 is connected to a signal input source 30 to have an electric charge so that a potential value thereof is non-zero, thereby causing a difference of the potential value between the first electrode 22 and the second electrode 23 to be non-zero. Similarly, when the first electrode 22 and the second electrode 23 are not grounded, the first electrode 22 and the second electrode 23 are connected to two signal input sources 30 respectively, and potential value differences are included therebetween.

The variable geometry electrode 24 is arranged on the other one of the two baseplates 21 which is different from where the first electrode 22 and the second electrode 23 are arranged, i.e., the first electrode 22 and the second electrode 23 are arranged on one of the two baseplates 21, and the variable geometry electrode 24 is arranged on the other one of the two baseplates 21. The variable geometry electrode 24 may be in a grounded configuration or may store the electric charge, and a potential of the variable geometry electrode 24 may vary based on implementation of the touch sensor 20. Further, a relative position between the variable geometry electrode 24 and the first electrode 22 can be selected from one of option I and option II as follows: the option I is that the variable geometry electrode 24 is partially located within the first projected area of the first electrode 22; the option II is that the variable geometry electrode 24 is not located within the first projected area of the first electrode 22. As can in be seen from the above-mentioned option I and option II, the variable geometry electrode 24 is limited to not be placed in a position perpendicular to the first electrode 22 but not be limited to a position relative to the second electrode 23, thereby the variable geometry electrode 24 can be not located within the second projected area, or partially located within the second projected area or completely located within the second projected area.

For an illustration of implementation of the touch sensor 20, please refer to FIG. 1, FIG. 2, and FIG. 3. Assuming that one of the two baseplates 21 is not controlled by touching initially, the first electrode 22 and the second electrode 23 output an initial self-capacity signal. Once the touch sensor 20 is controlled by the user 70 through the touch surface 201, one of the two baseplates 21 is pressed, thereby the first distance 211 between the two baseplates 21 is changed, and the second distance 221 between the first electrode 22 and the second electrode 23 is changed simultaneously. At this moment, an electric field generated between the first electrode 22 and the second electrode 23 changes in a horizontal direction, which causes the first electrode 22 and the second electrode 23 to output a post-press capacity signal. Once the touch surface 201 is no longer touched, one of the two baseplates 21 is released from a compressed state and recovers, so that the first distance 211 and the second distance 221 are restored, and the first electrode 22 and the second electrode 23 resume to output the initial self-capacity signal again.

As can be seen from the foregoing, the touch sensor 20 of the present invention is no longer based on changes of the electric field in a vertical direction between the two baseplates 21 as the basis for signal changes, but is instead based on changes of the electric field in the horizontal direction between the two baseplates 21. Therefore, the present invention is able to change positions of the first electrode 22, the second electrode 23 and the variable geometry electrode 24, so that the first electrode 22, the second electrode 23 and the variable geometry electrode 24 are no longer designed in a stacked structure to achieve the purpose of miniaturizing the touch sensor 20.

In one embodiment, the variable geometry electrode 24 and the first electrode 22 of the present invention are implemented by the above-mentioned option I, the variable geometry electrode 24 is at least partially located within the second projected area of the second electrode 23. In this embodiment, before the touch surface 201 is controlled by touching, the variable geometry electrode 24 does not contact the first electrode 22 and the second electrode 23, so that the initial self-capacity signal outputted by the first electrode 22 and the second electrode 23 is zero. When the touch surface 201 is controlled by touching, the variable geometry electrode 24 contacts and conducts the first electrode 22 and the second electrode 23 since the first distance 211 of the two baseplates 21 is changed, so that a current self-capacity signal outputted by the first electrode 22 and the second electrode 23 is non-zero, thereby causing the touch sensor 20 to generate an on-off operation function before and after touching.

In another embodiment, the variable geometry electrode 24 and the first electrode 22 of the present invention are implemented by the above-mentioned option II, the variable geometry electrode 24 can be located within or not within the second projected area of the second electrode 23. More specifically, please refer to FIG. 1, FIG. 2, and FIG. 3, in this embodiment, the variable geometry electrode 24 is located within the second projected area of the second electrode 23, the variable geometry electrode 24 is in a position perpendicular to the second electrode 23, and the variable geometry electrode 24 is in constant contact with the second electrode 23. Before the touch surface 201 is controlled by touching, the variable geometry electrode 24 conducts the second electrode 23, the first electrode 22 and the second electrode 23 output the initial self-capacity signal, after the touch surface 201 is controlled by touching, one of the two baseplates 21 is pressed, so that a contact area between the variable geometry electrode 24 and the second electrode 23 is changed, and the first electrode 22 and the second electrode 23 is changed simultaneously, thereby the first electrode 22 and the second electrode 23 are changed to output the post-press capacity signal. In addition, in this embodiment, an overall thickness of the variable geometry electrode 24 and the second electrode 23 stacked and without being forced is greater than the first distance of the two baseplates 21. The overall thickness refers to a thickness of the variable geometry electrode 24 and a thickness of the second electrode 23 before the touch sensor 20 is packaged. The variable geometry electrode 24 and the second electrode 23 are limited by the two baseplates 21 after the touch sensor 20 is packaged to be deformed. The variable geometry electrode 24 and the second electrode 23 in FIG. 1, FIG. 2, and FIG. 3 are depicted for illustration but not limited thereto. In addition, in this embodiment, the first electrode 22 is made of a conductive material 222 disposed on one of the two baseplates 21 and conductive to the variable geometry electrode 24, and an insulating material 223 disposed on the conductive material 222. In this embodiment, the conductive material 222 is a copper foil.

Please refer to FIG. 1, FIG. 2, and FIG. 3, in order to bond the two baseplates 21 and maintain the first distance 211 between the two baseplates, in one embodiment, the touch sensor 20 of the present invention comprises at least one support member 25 arranged between the two baseplates 21 and made of a double-sided tape, so that two ends of the at least one support member 25 are bonded to the two baseplates 21 respectively.

What is claimed is:
1. A touch sensor, comprising:
two baseplates, arranged at intervals, and a first distance formed therebetween;

a first electrode, arranged on one of the two baseplates and having a first projected area;

a second electrode, arranged on one of the two baseplates same as the first electrode arranged thereon, and a second distance formed between the second electrode and the first electrode; and a variable geometry electrode, arranged on an other one of the two baseplates different from the first electrode, and a relative position between the variable geometry electrode and the first electrode selected from one of following:

the variable geometry electrode partially located within the first projected area of the first electrode; and the variable geometry electrode not located within the first projected area of the first electrode;

wherein the first distance and the second distance are changed when one of the two baseplates is controlled by touching, and an electric field generated between the first electrode and the second electrode varies in a horizontal direction to change a self-capacity signal outputted by the first electrode and the second electrode output.

2. The touch sensor as claimed in claim 1, wherein the second electrode has a second projected area, and the variable geometry electrode is at least partially located within the second projected area.

3. The touch sensor as claimed in claim 2, wherein the variable geometry electrode is located within the second projected area, and the second electrode on one of the two baseplates is in contact with the variable geometry electrode both before and after being controlled by touching.

4. The touch sensor as claimed in claim 3, wherein an overall thickness of the second electrode and the variable geometry electrode is greater than the first distance.

5. The touch sensor as claimed in claim 4, wherein the first electrode is made of a conductive material disposed on one of the two baseplates, and an insulating material disposed on the conductive material.

6. The touch sensor as claimed in claim 1, wherein the touch sensor comprises at least one support member arranged between the two baseplates, and two ends of the at least one support member are bonded to the two baseplates respectively.

* * * * *